(12) United States Patent
Babcock

(10) Patent No.: US 11,423,565 B2
(45) Date of Patent: Aug. 23, 2022

(54) 3D MAPPING USING SIGN REFERENCE POINTS

(71) Applicant: TOYOTA MOTOR NORTH AMERICA, INC., Plano, TX (US)

(72) Inventor: Joshua Babcock, Dallas, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 572 days.

(21) Appl. No.: 16/528,437

(22) Filed: Jul. 31, 2019

(65) Prior Publication Data

US 2021/0035323 A1 Feb. 4, 2021

(51) Int. Cl.
*G06T 7/73* (2017.01)
*G01C 21/36* (2006.01)
*G06T 7/62* (2017.01)
*G01S 13/89* (2006.01)
*G01S 17/89* (2020.01)

(52) U.S. Cl.
CPC ............ *G06T 7/73* (2017.01); *G01C 21/3602* (2013.01); *G06T 7/62* (2017.01); *G01S 13/89* (2013.01); *G01S 17/89* (2013.01); *G06T 2207/30252* (2013.01)

(58) Field of Classification Search
CPC ... G06T 7/73; G06T 7/62; G06T 2207/30252; G01C 21/3602; G01C 21/005; G01C 21/04; G01S 13/89; G01S 17/89; G01S 17/42; G01S 7/4808; G01S 13/931; G01S 17/86; G01S 17/931
See application file for complete search history.

(56) References Cited

U.S. PATENT DOCUMENTS

| 9,207,087 | B2 | 12/2015 | Kim |
| 10,240,937 | B2 | 3/2019 | Chung |
| 2017/0122762 | A1 | 5/2017 | Van Der Molen |
| 2021/0019897 | A1* | 1/2021 | Biswas ..................... G06T 7/11 |

* cited by examiner

*Primary Examiner* — Yuen Wong
(74) *Attorney, Agent, or Firm* — Sheppard, Mullin, Richter & Hampton LLP; Hector A. Agdeppa; Daniel N. Yannuzzi

(57) ABSTRACT

Systems and methods are provided for position refinement of a vehicle, and may include using a vehicle mounted image sensor to capture an image of a scene proximate the vehicle; analyzing the captured images and identifying a positional landmark of the scene proximate the vehicle; and refining a position of the vehicle based on the identified positional landmark.

23 Claims, 5 Drawing Sheets

3D MAPPING USING SIGN REFERENCE POINTS

TECHNICAL FIELD

The present disclosure relates generally to vehicular positioning systems, and in particular, some implementations may relate to using image data of vehicle surroundings to refine vehicle position determinations.

DESCRIPTION OF RELATED ART

Vehicle positioning systems of various forms have become commonplace for vehicles of all types. Satellite-based GPS navigation systems have gained increasing popularity over the last 2 decades. More recently, app-based navigation systems have become popular on smart phones, and these devices are often integrated into vehicle systems and available via vehicle head units. However, while the systems have become fairly accurate, they do occasionally suffer from some drawbacks. For example, current system sometimes have difficulty determining an attitude (e.g., bearing, direction or heading) of the vehicle, especially if the vehicle is stopped or moving slowly. Also, obstructions that may interfere with signals used by the systems can cause errors, delays or temporary glitches in position determination.

BRIEF SUMMARY OF THE DISCLOSURE

According to various embodiments of the disclosed technology, An image-based position determination system for a vehicle may include: using a vehicle mounted image sensor to capture an image of a scene proximate the vehicle; analyzing the captured images and identifying a positional landmark of the scene proximate the vehicle; and refining a position of the vehicle based on the identified positional landmark. The method may further include determining a position of the identified positional landmark relative to the vehicle and using this relative position information to determine an attitude of the vehicle.

In various embodiments a position of the identified positional landmark relative to the vehicle may include a distance and bearing of the of the identified positional landmark relative to the vehicle. In various embodiments the distance to the identified positional landmark is determined using a vehicle-mounted radar, lidar or infrared system. In various embodiments the distance to the identified positional landmark may be determined by measuring a size of the identified positional landmark on a frame of the captured image and using a focal length of the image sensor to determine the distance to the identified positional landmark.

The method may further include determining a location of the vehicle using a position determination system, and refining a position of the vehicle based on the identified positional landmark may include verifying or improving and accuracy of the location of the vehicle determined by the position determination system.

The method may further include refining a position of the vehicle based on the identified positional landmark may include improving an accuracy of a determined location of the vehicle. The refining a position of the vehicle based on the identified positional landmark may include determining an attitude of the vehicle.

In various embodiments determining an attitude of the vehicle may include determining a relative position of the identified positional landmark relative to the vehicle, determining an actual physical location of the positional landmark and comparing the relative position to the actual physical location to determine the attitude of the vehicle.

A position refinement system for a vehicle may include: a processor; and a memory coupled to the processor to store instructions, which when executed by the processor, cause the processor to perform operations, the operations including using a vehicle mounted image sensor to capture an image of a scene proximate the vehicle; analyzing the captured images and identifying a positional landmark of the scene proximate the vehicle; and refining a position of the vehicle based on the identified positional landmark. The operations may further include determining a position of the identified positional landmark relative to the vehicle and using this relative position information to determine an attitude of the vehicle.

In various embodiments a position of the identified positional landmark relative to the vehicle may include a distance and bearing of the of the identified positional landmark relative to the vehicle. In various embodiments the distance to the identified positional landmark is determined using a vehicle-mounted radar, lidar or infrared system. The distance to the identified positional landmark may be determined by measuring a size of the identified positional landmark on a frame of the captured image and using a focal length of the image sensor to determine the distance to the identified positional landmark.

In various embodiments the operations further include determining a location of the vehicle using a position determination system, and refining a position of the vehicle based on the identified positional landmark may include verifying or improving and accuracy of the location of the vehicle determined by the position determination system.

In various embodiments refining a position of the vehicle based on the identified positional landmark may include improving an accuracy of a determined location of the vehicle. In various embodiments refining a position of the vehicle based on the identified positional landmark may include determining a relative position of the identified positional landmark relative to the vehicle, determining an actual physical location of the positional landmark and comparing the relative position to the actual physical location to determine an attitude of the vehicle.

A position refinement system for a vehicle may include: a communication circuit to receive image data captured by image sensor; an analysis module configured to analyze captured image data and to identify a positional landmark of a scene proximate the vehicle; and a position refinement module configured to refine a position of the vehicle based on the identified positional landmark. In various embodiments the position refinement module is further configured to determine a position of the identified positional landmark relative to the vehicle and using this relative position information to determine an attitude of the vehicle. In various embodiments a position of the identified positional landmark relative to the vehicle may include a distance and bearing of the of the identified positional landmark relative to the vehicle.

In various embodiments the distance to the identified positional landmark is determined using a vehicle-mounted radar, lidar or infrared system. In various embodiments the distance to the identified positional landmark is determined by measuring a size of the identified positional landmark on a frame of the captured image and using a focal length of the image sensor to determine the distance to the identified positional landmark.

In various embodiments refining a position of the vehicle based on the identified positional landmark may include improving an accuracy of a determined location of the vehicle. In various embodiments refining a position of the vehicle based on the identified positional landmark may include determining a relative position of the identified positional landmark relative to the vehicle, determining an actual physical location of the positional landmark and comparing the relative position to the actual physical location to determine an attitude of the vehicle.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the systems and methods disclosed herein can be implemented to capture and use image data to enhance vehicle navigation functions. Analysis of captured images can be used to enhance the quality and accuracy of position determination and navigation and can provide additional information to vehicle operators. For example, image information can be used to determine a direction of vehicle is facing, which might not otherwise be determinable using conventional GPS or other geolocation technology in a non-moving vehicle. Image information can also be used to verify the accuracy or improve the precision of the navigation system.

Embodiments may be implemented to use cameras or other image sensors mounted on the vehicle to capture various views around vehicle or an entire 360° image surrounding vehicle. Front, rear and side facing cameras, for example, can be included to capture images in all directions. Fewer or a greater number of cameras can be used depending on the field of view of the cameras. Image processing techniques can be used to evaluate the captured images and gather specific information about the scene to aid position determination or in the vehicle navigation process. For example, sign data can be captured, read and interpreted by the system to determine position related characteristics such as which direction the vehicle is facing and a location of the vehicle. Further to this example, exit signs on the freeway might be read to determine the direction of travel or a vehicle location (e.g., by the order of the exits at a given interchange; or by a stated distance to an exit, or city etc.); or sign information itself (e.g., "I5 North") can provide a travel direction.

Image information from surroundings (other than or in addition to signs) can also be used to pinpoint location and identify direction of travel. Images can be collected from a plurality of vehicles and correlated with navigation information from those vehicles so that the images can be associated with precise locations and directions of travel. For example, images with certain buildings, towers, or other landmarks appearing on the left may indicate the vehicle is traveling north. As another example, the presence of landmarks or land features in the image may be used to determine a location or verify a determined location.

Machine learning and artificial intelligence techniques can be used to train the data set and further refine models used to make position and direction-of-travel determinations. User input or simply the collection of a sufficient volume of data points can be used to verify and train the models.

Figure 1:
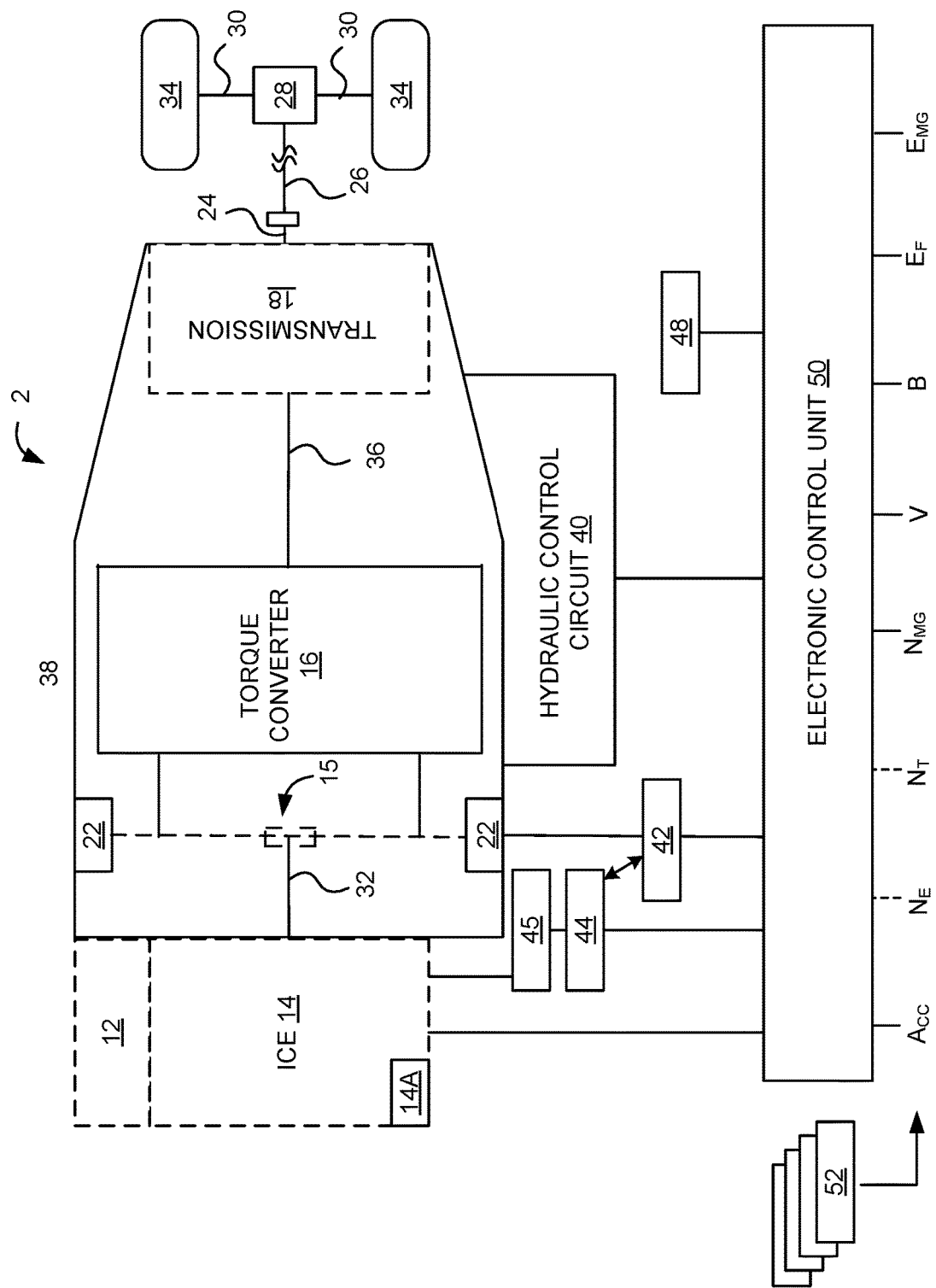
FIG. 1 is a schematic representation of an example hybrid vehicle with which embodiments of the systems and methods disclosed herein may be implemented.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for position refinement can be implemented in other types of vehicle including gasoline- or diesel-powered vehicles, fuel-cell vehicles, electric vehicles, or other vehicles.

FIG. 1 illustrates a drive system of a vehicle 102 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 102 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 102 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 (including Sensors 152 of FIG. 3) may include their own processing capability to compute the results for additional information that can be provided. In other embodiments, one or more sensors may be data-gathering-only sensors that provide only raw data. In further embodiments, hybrid sensors may be included that provide a combination of raw data and processed data. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
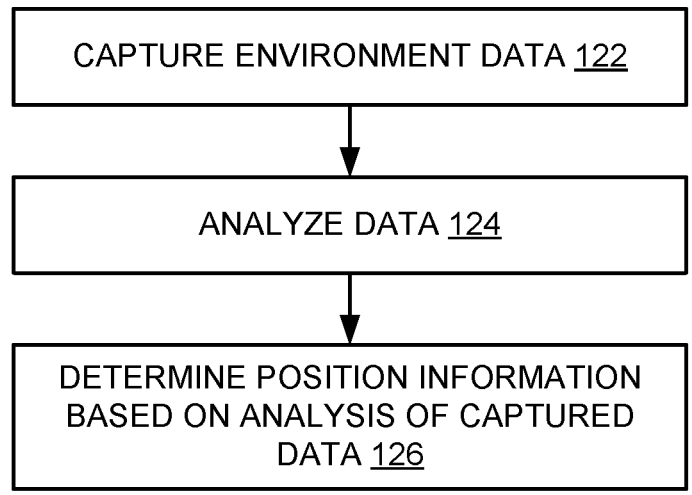
FIG. 2 illustrates an example process for refining vehicle position in accordance with one embodiment.

As noted above, embodiments may be implemented to capture image and other information of surroundings of the vehicle at a given point in time and this data can be analyzed on board the vehicle, or transmitted external to the vehicle for remote analysis) to determine refined position information for the vehicle. FIG. 2 illustrates an example process for vehicle position refinement in accordance with one embodiment. With reference now to FIG. 2, at operation 122 one or more vehicle sensors capture data regarding the surrounding vehicle environment. For example, cameras or other image sensors can be used capture images in one or more directions surrounding the vehicle. In some embodiments, a sufficient quantity of image sensors with appropriate fields of view can be utilized in combination to capture up to a full 360° view around the vehicle. Other sensors can be used instead of or in addition to image sensors. For example, radar, lidar, infrared or other like sensors can be used to detect distances to objects or object features. The sensors may be used, for example, to detect surrounding structures (e.g., buildings, trees, light posts, etc.) and distances to those structures.

At operation 124, data received from those sensors is analyzed to determine information about surroundings of the vehicle. In one embodiment, this information can be computed in real time such that current position information of the vehicle can be refined. Image and other data processing techniques can be used to determine positional landmarks about the vehicle such as, for example, road signs, monuments, building signage, advertisements or other signs; buildings of various types, shapes and sizes; natural landmarks; and so on. The analysis may also be used to identify these positional landmarks. In the case of signs, for example, optical character recognition can be used to read and interpret sign information as part of the analysis. In the case of buildings or structures, image analysis can be used to identify based on its shape or based on the size, positioning and orientation of its structural elements, the particular building or structure. Similar techniques can be used to identify natural landmarks such as large trees, rock formations or other natural features.

At operation 126, the analyzed data can be used to refine vehicle position information. For example, the system might confirm the presence of and distance to a positional landmark to confirm a vehicle position reported by the vehicle's GPS system. Distance information may also be used to refine the determined position, such as by triangulating distance measurements to multiple positional landmarks or by computing distance and angle to a given positional landmark. As another example of refining vehicle position, the system might determine or verify an attitude (e.g., pointing direction or heading) of the vehicle. For example, road signs can be interpreted to determine direction of travel (e.g., by reading direction information on signs such as North, South, etc, by reading the order of exit signs, by reading the progression of mile markers, and so on), angular direction to positional landmarks can determine an attitude or heading (e.g., a particular positional landmark is XX degrees off the front of the vehicle, or more coarsely to the right or left of the vehicle), and so on. Determining an attitude of the vehicle may include determining a relative position of the identified positional landmark relative to the vehicle (e.g., distance and bearing), determining an actual physical location of the positional landmark (e.g., from a database of known positional landmarks) and comparing the relative position to the actual physical location to determine the attitude of the vehicle. Further to this example, the known actual physical location of a positional landmark may indicate that the landmark is on the west side of a north-south road. Accordingly, when the landmark appears with a bearing to the left of the vehicle, it can be determined that the vehicle is heading north.

Figure 3:
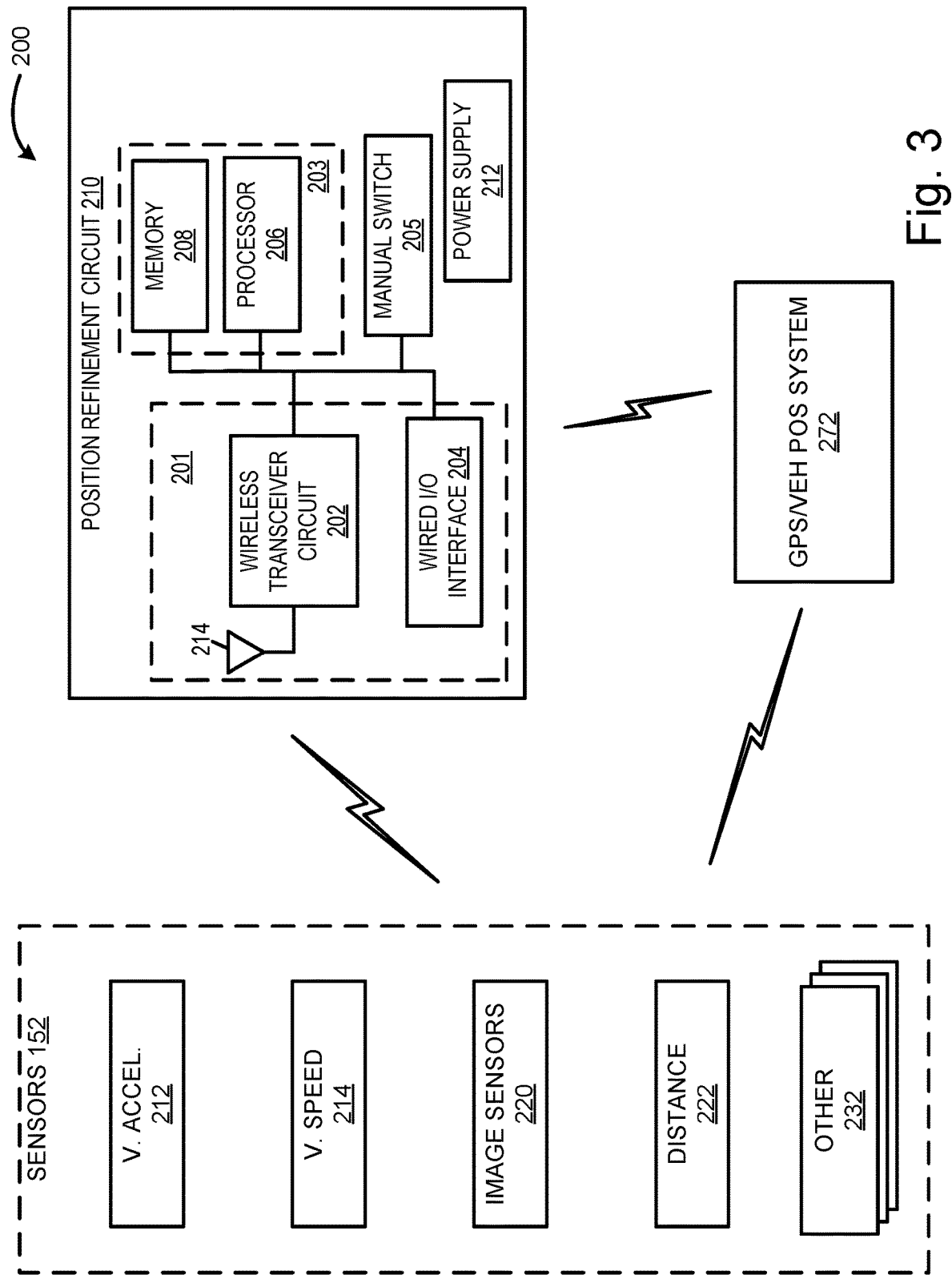
FIG. 3 illustrates an example position refinement system in accordance with one embodiment.

FIG. 3 illustrates an example architecture for position refinement in accordance with one embodiment of the systems and methods described herein. Referring now to FIG. 3, in this example, position refinement system 200 includes a position refinement circuit 210, a plurality of sensors 152, and a vehicle positioning system 272. Sensors 152 and vehicle positioning system 272 can communicate with position refinement circuit 210 via a wired or wireless communication interface. Sensors 152 and vehicle positioning system 272 can also communicate with each other as well, as with other vehicle systems. Position refinement circuit 210 can be implemented as an ECU or as part of an ECU such as, for example electronic control unit 50. In other embodiments, position refinement circuit 210 can be implemented independently of the ECU.

Position refinement circuit 210 in this example includes a communication circuit 201, a refinement circuit 203 (including a processor 206 and memory 208 in this example) and a power supply 212. Components of position refinement circuit 210 are illustrated as communicating with each other via a data bus, although other communication in interfaces can be included. In some embodiments, position refine can be activated automatically or manually. In this example, position refinement circuit 210 also includes a manual activation switch 205 that can be operated by the user to manually activate or deactivate the refinement mode.

Refinement circuit 203 can implement an analysis module to perform image and other data analysis from the sensors, in a position refinement module to perform position refinement based on the results of the image analysis by the analysis module. These can be implemented as separate modules (e.g., separate circuits 203) or integrated into the same module. Processor 206 can include one or more GPUs, CPUs, microprocessors, or any other suitable processing system. Processor 206 may include a single core or multi-core processors. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208, can be made up of one or more modules of one or more different types of memory, and may be configured to store data and other information as well as operational instructions that may be used by the processor 206 to position refinement circuit 210.

Although the example of FIG. 3 is illustrated using processor and memory circuitry, as described below with reference to circuits disclosed herein, refinement circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a position refinement circuit 210.

Communication circuit 201 either or both a wireless transceiver circuit 202 with an associated antenna 214 and a wired I/O interface 204 with an associated hardwired data port (not illustrated). As this example illustrates, communications with position refinement circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 214 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by position refinement circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 210 can include one or more of a battery or batteries (such as, e.g., Li-ion, Li-Polymer, NiMH, NiCd, NiZn, and $NiH_2$, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 152 can include additional sensors that may or not otherwise be included on a standard vehicle 10 with which the system 200 is implemented. In the illustrated example, sensors 152 include vehicle acceleration sensors 212, vehicle speed sensors 214, cameras or other image sensors 220 radar, lidar, infrared or other like distance sensors 222. Additional sensors 232 can also be included as may be appropriate for a given implementation of system 200. Vehicle positioning system 272 can be implemented as a satellite position determination system (e.g., GPS) or other vehicle positioning system.

During operation, position refinement circuit 210 can receive information from various vehicle sensors to be used to perform position refinement. Communication circuit 201 can be used to transmit and receive information between position refinement circuit 210 and sensors 152, and position refinement circuit 210 and vehicle positioning system 272. Also, sensors 152 may communicate with vehicle positioning system 272 directly or indirectly (e.g., via communication circuit 201 or otherwise).

In various embodiments, communication circuit 201 can be configured to receive data and other information from sensors 152 that is used in performing positioning refinement. Additionally, communication circuit 201 can be used to send an activation signal or other activation information to sensors or the positioning system as part of entering a position refinement mode.

Figure 4:
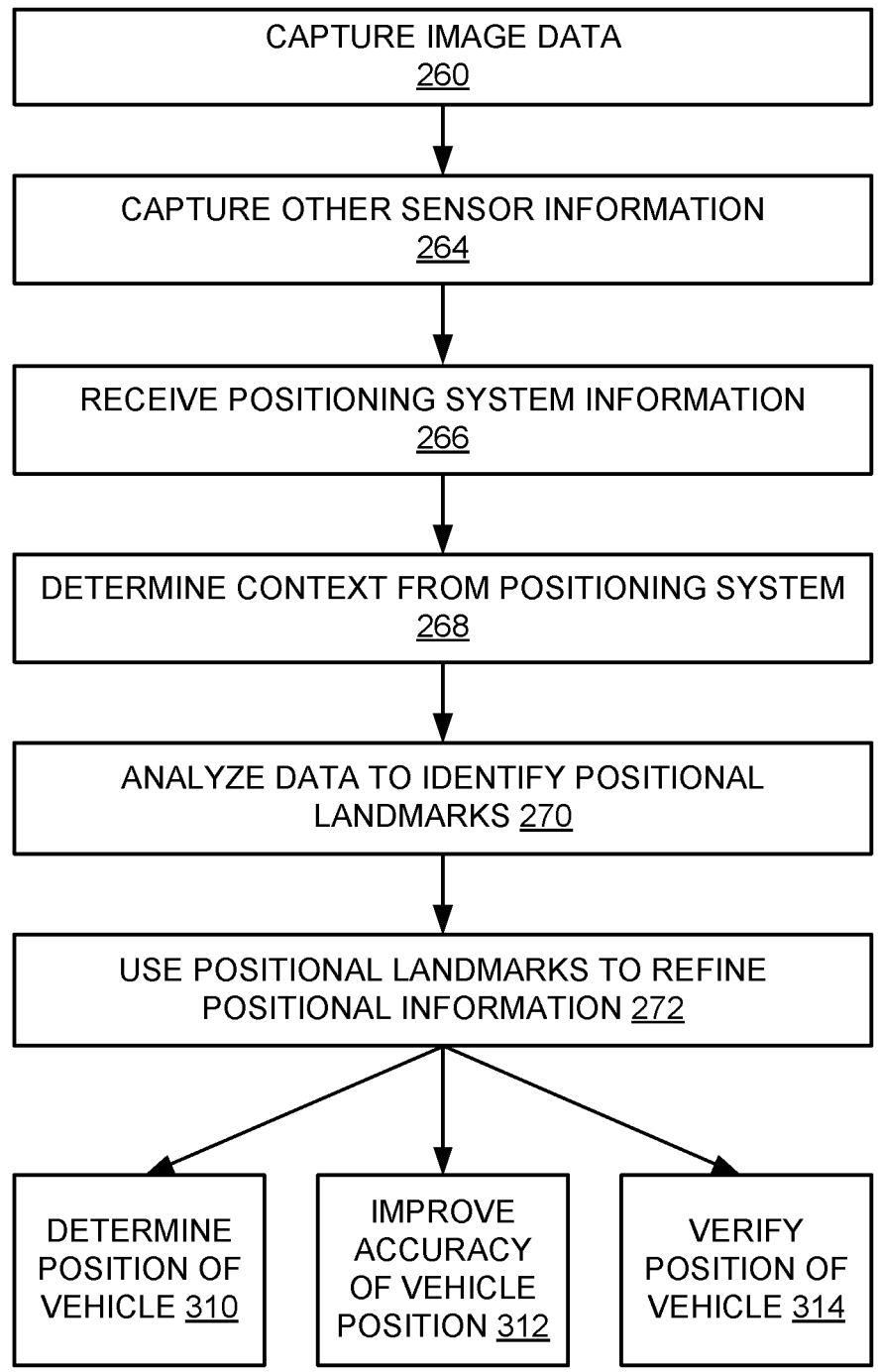
FIG. 4 illustrates another example process for refining vehicle position in accordance with one embodiment.

FIG. 4 illustrates an example process for position refinement in accordance with one embodiment. With reference now to FIG. 4, at operation 260, one or more image sensors such as cameras or other image sensors capture image data. These can include dedicated image sensors used for position refinement, or they can include image sensors that are shared with other vehicular functions. Examples of image sensors shared with other functions may include a backup camera, lane change assist cameras, forward-looking cameras, image sensors for autonomous driving or other image sensors that may be used to perform other vehicle functions. Similarly, distance measurement sensors (e.g. radar lidar or infrared sensor) can be independent or they can be shared with other vehicle functions such as adaptive cruise control, parking sensors, sensors for autonomous driving and so on. In some implementations, existing sensors on a vehicle can be used to retrofit a vehicle to include the position refinement functionality.

The image sensors can be positioned to view the scene surrounding the vehicle. In some embodiments, only a single image sensor such as, for example, a forward-facing camera is used to capture a scene. In other embodiments, other quantities of image sensors are used to capture more views about the vehicle. For example, front-facing, rear-facing side-facing cameras can be used to capture views to the front, rear and sides of the vehicle. In yet another embodiment, sufficient cameras can be included to capture a full 360° view surrounding the vehicle. The focal length, quantity and placement of the image sensors can be chosen to capture a desired amount of scenery about the vehicle. Additionally, image sensors can be mounted on movable mounts such that they can be panned or tilted to capture desired scenes external to the vehicle. The zoom function can also be included, whether digital zoom optical zoom or both, to allow the image sensor to zoom in or zoom out of various scenes. This might be useful, for example, to read small text or images on signs or to otherwise ascertain the nature of or details regarding a positional landmark.

At operation 264, other sensor information may be captured. As noted in the example of FIG. 3, distance measurement sensors such as radar, lidar, infrared or other sensors can be used to measure the distance from the vehicle to an object. The sensors may also be used to determine the surface relief or texture of a positional landmark being sensed. In some embodiments, surface relief might be used to assist in identifying a landmark. This information might be used in some circumstances in combination with information determined from the image sensors to identify positional landmarks and to help in the position refinement process.

At operation 266, the position refinement system receives position information from the vehicle positioning system (e.g., vehicle positioning system 272). This information can include an actual position of the vehicle as determined by the vehicle positioning system. The information may be presented in coordinates (e.g., latitude, longitude), as a street address, as a location on a map grid, or in any other format usable by the system. In some embodiments, the system can use position information from the vehicle positioning system as a starting point for its analysis or as a position that it refines. In other embodiments, the system may be configured to determine a refined position without using position information from the vehicle positioning system.

At operation 268, the system can use the position information from the vehicle positioning system to determine a context in which to operate. For example, the system may be configured to include a database (whether onboard or remote from the vehicle) of positional landmarks associated with the determined position. The system may be configured to use this knowledge to look for expected positional landmarks. For example, the system may determine using its current position that there should be a particular building on the left-hand side of the vehicle and a statue of a soldier on a horse on the right-hand side of the vehicle. The system can use this information to activate the image sensors to look for those landmarks, in embodiments where the image sensors can be panned or tilted, the system can be configured to pan and tilt the image sensors to locate the expected positional landmarks.

At operation 270, the position refinement system analyzes captured data to determine positional landmarks in the vicinity of the vehicle. Image information captured by one or more image sensors can be analyzed to determine the presence of and to identify positional landmarks surrounding the vehicle. For example, machine learning can be used to classify objects detected in image. Classification typically can take place using pattern matching of data in a two-dimensional matrix. Techniques such as edge detection and feature detection can be used in the identification process.

In addition, distance measuring tools such as radar, lidar, infrared sensors can be used to determine distances to and landmark. Pulses can be emitted from these systems and a reflected pulse received. Time-of-flight measurements can be taken to determine the round-trip travel time of the pulses in this information can be used to calculate the distance (e.g., d=r*t, where d equals distance r equals rate and t equals time). These systems can also be used to perform 3D-based object perception to identify or to aid in identifying positional landmarks. Mobile laser scanning may also be used to determine distances and identify positional landmarks. Objects can be classified or identified, for example, using 3D point clouds.

At operation 272, the system uses the identified positional landmarks to refine vehicle positional information. As illustrated, this step can include determining the position of the vehicle 310, improving the accuracy of an already determined position of the vehicle 312 (e.g., as determined by vehicular positioning system 272), and verifying an already determined position of the vehicle 314.

The image information obtained can be tracked by the position of and direction in which the capturing image sensors facing such that a bearing to each detected positional landmark can also be determined. For example, if a right-facing camera of the vehicle identifies the Madison Building of the USPTO, the system can determine that the Madison Building is to the right of the vehicle (and therefore, the vehicle is traveling or facing east on the southernmost section of Dulany Street in Alexandria, Va. More precise determination can be made by determining the position of the positional landmark in the frame and the distance to the positional landmark. The size of the positional landmark in the frame relative to the focal length of the image sensor can be used to determine the distance of the landmark to the vehicle.

Optical character recognition can also be used to read street signs and other road signs to be used to refine the vehicle position. For example, street signs having street names (e.g., at cross streets) can be used to identify a street on which the vehicle is traveling and the most recent cross street. The angle of the camera or cameras that captured the street names can be used to facilitate determining which street is across street and which street is the street on which the vehicle is traveling. The history of cross streets can be used to determine a direction of travel (e.g., where the vehicle passes Apple, Birch, Cedar, Dogwood, etc. in that order, the direction can be determined). Additionally, the timing between cross streets can be used to determine vehicle speed. As another example, highway signs indicating the direction of travel (e.g., I5 North) can be analyzed and read to determine or confirm that the vehicle is traveling in a northerly direction. As a further example, the progression of exit signs or mile marker signs on a freeway can also be used to determine or verify a direction of travel.

Optical character recognition can also be used to refine position information by recognizing text on positional landmarks other than street signs. For example, by a combination of image and character recognition, the system might identify the Official Seal of the United States Patent and Trademark Office and use this information to verify the position of the vehicle. As another example, the system may be aware that the vehicle is somewhere on Headquarters Drive in Plano, Tex. and the image recognition system may detect a sign with the word TOYOTA on it. From this, the system can determine that the vehicle is in front of the headquarters of Toyota Motor North America, Inc. the angle of the sign relative to the vehicle can be used to determine direction of travel and the combination of angle and distance to the sign can be used to determine a precise position of the vehicle.

Other sensor information can also be used to perform position refinement. For example, vehicle acceleration and speed (e.g., from acceleration sensor to 12 and speed sensor 214) can be used to verify that the vehicle is traveling and confirm speed information determined by the position refinement circuit. Also, information from the sensors can be cross checked to determine if there is a possible error. For example, were the image information indicates the vehicle is stopped but the speed sensor indicates that the vehicle is in motion, and error can be flagged such that the veracity of the data can be verified.

Figure 5:
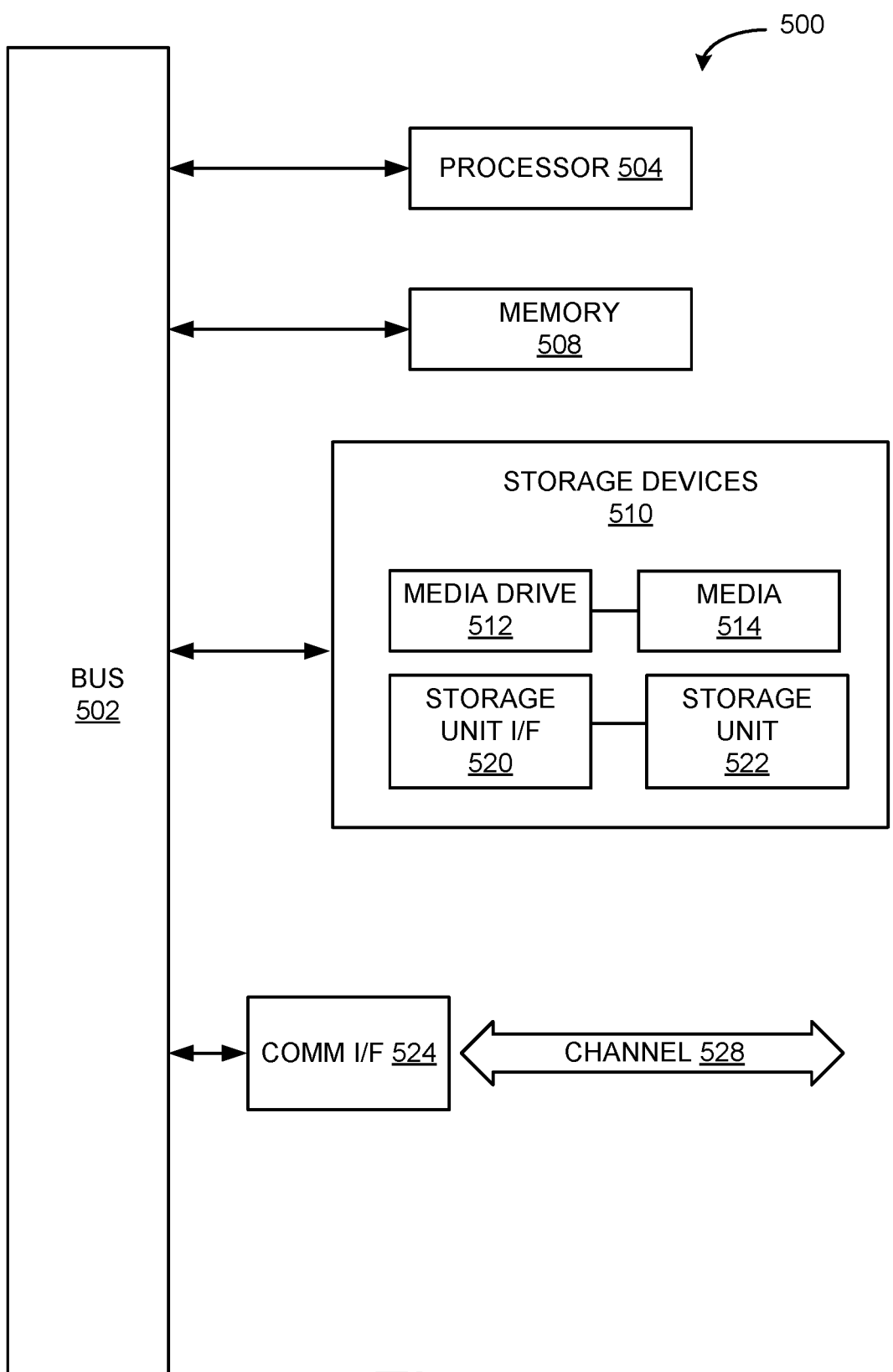
FIG. 5 illustrates an example computing component that may be used to implement various features of embodiments described in the present disclosure.

As used herein, the terms circuit and module might describe a given unit of functionality that can be performed in accordance with one or more embodiments of the present application. As used herein, a circuit or module might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where circuits or modules are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An image-based position determination system for a vehicle, comprising:
   using a vehicle mounted image sensor to capture an image of a scene proximate the vehicle;
   analyzing the captured images and identifying a positional landmark of the scene proximate the vehicle;
   refining a position of the vehicle based on the identified positional landmark by determining a position of the identified positional landmark relative to the vehicle and using the relative position to determine an attitude of the vehicle; and
   controlling the vehicle based on the refined position.

2. The system of claim 1, wherein using the relative position to determine the attitude of the vehicle comprises at least one of interpreting road signs to determine a direction of travel and determining an angular direction to the identified positional landmark.

3. The system of claim 1, wherein a position of the identified positional landmark relative to the vehicle comprises a distance and bearing of the identified positional landmark relative to the vehicle.

4. The system of claim 3, wherein the distance to the identified positional landmark is determined using a vehicle-mounted radar, lidar or infrared system.

5. The system of claim 3, wherein the distance to the identified positional landmark is determined by measuring a size of the identified positional landmark on a frame of the captured image and using a focal length of the image sensor to determine the distance to the identified positional landmark.

6. The system of claim 1, further comprising determining a location of the vehicle using a position determination system, and wherein refining a position of the vehicle based on the identified positional landmark comprises verifying or improving an accuracy of the location of the vehicle determined by the position determination system.

7. The system of claim 1, further comprising wherein refining a position of the vehicle based on the identified positional landmark comprises improving an accuracy of a determined location of the vehicle.

8. The system of claim 1, wherein determining the attitude of the vehicle comprises comparing the relative position to an actual physical location of the positional landmark to determine the attitude of the vehicle.

9. A position refinement system for a vehicle, comprising:
   a processor; and
   a memory coupled to the processor to store instructions, which when executed by the processor, cause the processor to perform operations, the operations comprising:
   using a vehicle mounted image sensor to capture an image of a scene proximate the vehicle;
   analyzing the captured images and identifying a positional landmark of the scene proximate the vehicle;
   refining a position of the vehicle based on the identified positional landmark by determining a position of the identified positional landmark relative to the vehicle and using the relative position to determine an attitude of the vehicle; and
   controlling the vehicle based on the refined position.

10. The system of claim 9, wherein using the relative position to determine the attitude of the vehicle comprises at least one of interpreting road signs to determine a direction of travel and determining an angular direction to the identified positional landmark.

11. The system of claim 9, wherein a position of the identified positional landmark relative to the vehicle comprises a distance and bearing of the identified positional landmark relative to the vehicle.

12. The system of claim 11, wherein the distance to the identified positional landmark is determined using a vehicle-mounted radar, lidar or infrared system.

13. The system of claim 11, wherein the distance to the identified positional landmark is determined by measuring a size of the identified positional landmark on a frame of the captured image and using a focal length of the image sensor to determine the distance to the identified positional landmark.

14. The system of claim 9, wherein the operations further comprise determining a location of the vehicle using a position determination system, and wherein refining a position of the vehicle based on the identified positional landmark comprises verifying or improving an accuracy of the location of the vehicle determined by the position determination system.

15. The system of claim 9, wherein refining a position of the vehicle based on the identified positional landmark comprises improving an accuracy of a determined location of the vehicle.

16. The system of claim 9, wherein determining the attitude of the vehicle comprises comparing the relative position to an actual physical location of the positional landmark to determine the attitude of the vehicle.

17. A position refinement system for a vehicle, comprising:
   a communication circuit to receive image data captured by an image sensor;
   an analysis circuit configured to analyze captured image data and to identify a positional landmark of a scene proximate the vehicle; and
   a position refinement circuit configured to:
      refine a position of the vehicle based on the identified positional landmark;
      determine a position of the identified positional landmark relative to the vehicle and use the relative position to determine an attitude of the vehicle; and
      control the vehicle based on the refined position.

18. The system of claim 17, wherein the relative position to determine the attitude of the vehicle comprises at least one of interpreting road signs to determine a direction of travel and determining an angular direction to the identified positional landmark.

19. The system of claim 18, wherein a position of the identified positional landmark relative to the vehicle comprises a distance and bearing of the identified positional landmark relative to the vehicle.

20. The system of claim 19, wherein the distance to the identified positional landmark is determined using a vehicle-mounted radar, lidar or infrared system.

21. The system of claim 19, wherein the distance to the identified positional landmark is determined by:
   measuring a size of the identified positional landmark on a frame of a captured image; and
   using a focal length of the image sensor to determine the distance to the identified positional landmark.

22. The system of claim 17, wherein refining a position of the vehicle based on the identified positional landmark comprises improving an accuracy of a determined location of the vehicle.

23. The system of claim 17, wherein determining the attitude of the vehicle comprises comparing the relative position to an actual physical location of the positional landmark to determine the attitude of the vehicle.

* * * * *